(12) United States Patent
Umezawa et al.

(10) Patent No.: US 8,636,139 B2
(45) Date of Patent: Jan. 28, 2014

(54) CONVEYOR AND CONVEYING DEVICE

(75) Inventors: Kazuhisa Umezawa, Chiba (JP); Takao Arai, Kyoto (JP); Kazuhiro Sei, Kyoto (JP)

(73) Assignee: Seiko I Infotech Inc. (JP)

( * ) Notice: Subject to any disclaimer, the term of this patent is extended or adjusted under 35 U.S.C. 154(b) by 307 days.

(21) Appl. No.: 12/735,358

(22) PCT Filed: Dec. 12, 2008

(86) PCT No.: PCT/JP2008/072619
§ 371 (c)(1),
(2), (4) Date: Feb. 22, 2011

(87) PCT Pub. No.: WO2009/087854
PCT Pub. Date: Jul. 16, 2009

(65) Prior Publication Data
US 2011/0139581 A1    Jun. 16, 2011

(30) Foreign Application Priority Data
Jan. 10, 2008   (JP) .................................. 2008-002858

(51) Int. Cl.
*B65G 15/12* (2006.01)
(52) U.S. Cl.
USPC ..................... 198/689.1; 198/817; 271/197
(58) Field of Classification Search
USPC ................. 198/689.1, 570; 271/197
See application file for complete search history.

(56) References Cited

U.S. PATENT DOCUMENTS

| | | | | |
|---|---|---|---|---|
| 5,139,253 A | * | 8/1992 | Bohme et al. | 271/197 |
| 5,423,255 A | * | 6/1995 | Maass | 101/232 |
| 5,810,350 A | * | 9/1998 | Pollich | 271/276 |
| 5,967,510 A | * | 10/1999 | Ono et al. | 271/196 |
| 6,131,901 A | * | 10/2000 | Hirohata | 271/276 |
| 6,216,848 B1 | * | 4/2001 | Zens | 198/689.1 |
| 6,572,520 B2 | * | 6/2003 | Blumle | 493/450 |
| 7,575,114 B2 | * | 8/2009 | Buchko | 198/867.14 |

FOREIGN PATENT DOCUMENTS

| | | |
|---|---|---|
| DE | 20310194 | 10/2003 |
| JP | 08002770 | 1/1996 |
| JP | 08025778 | 1/1996 |
| JP | 2001088977 | 4/2001 |

* cited by examiner

*Primary Examiner* — Ramya Burgess
*Assistant Examiner* — Thomas Randazzo
(74) *Attorney, Agent, or Firm* — Adams & Wilks

(57) ABSTRACT

A conveyor has drive and driven shafts mounted to undergo rotation, a transmitting member transmitting a rotational drive of the drive shaft to the driven shaft in synchronization relative one another, an elastic conveying member looped around the drive and driven shafts for conveying an object, and a guide portion arranged between the drive and driven shafts. The guide portion has rotators, receiving portions receiving respective ones of the rotators, openings communicating with through-holes of the conveying member, communication portions communicating with the openings and positioned so that each of the rotators is arranged between respective adjacent pairs of the communication portions, and connection members communicating with the openings via the communication portions. The connection members are configured for connection to a suction device for drawing air from the openings through the respective communication portions to draw by suction the conveyance object toward the conveying member.

20 Claims, 11 Drawing Sheets

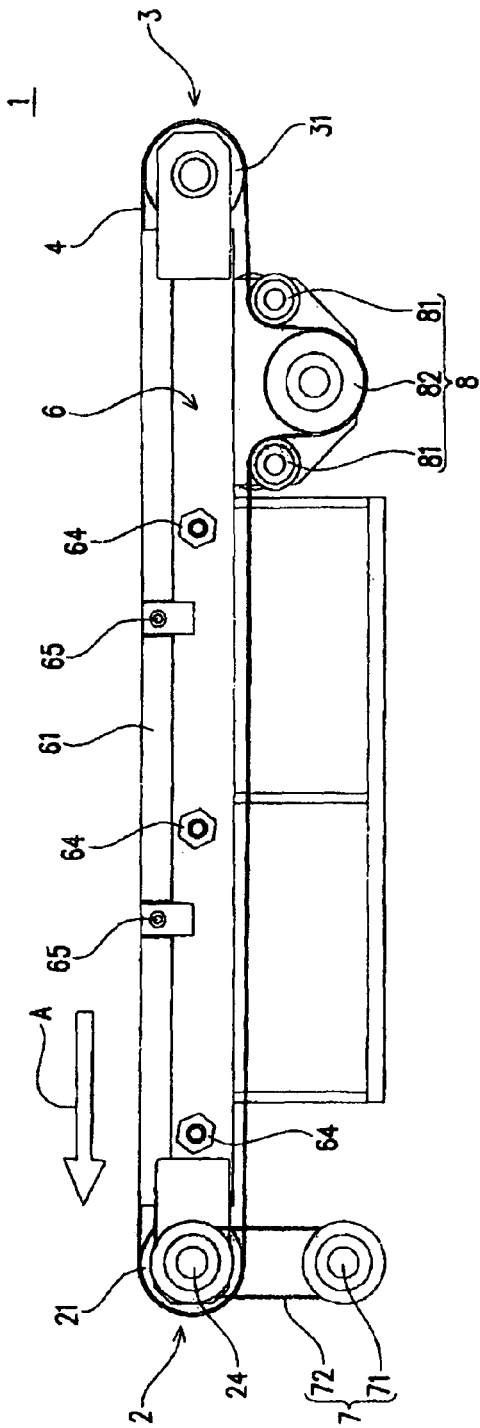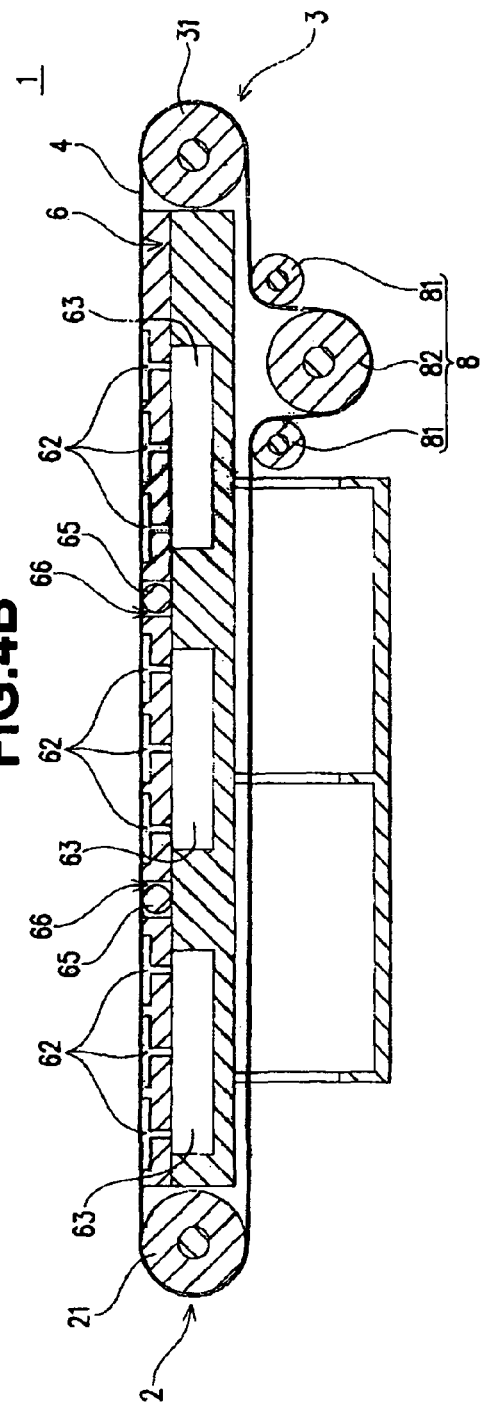

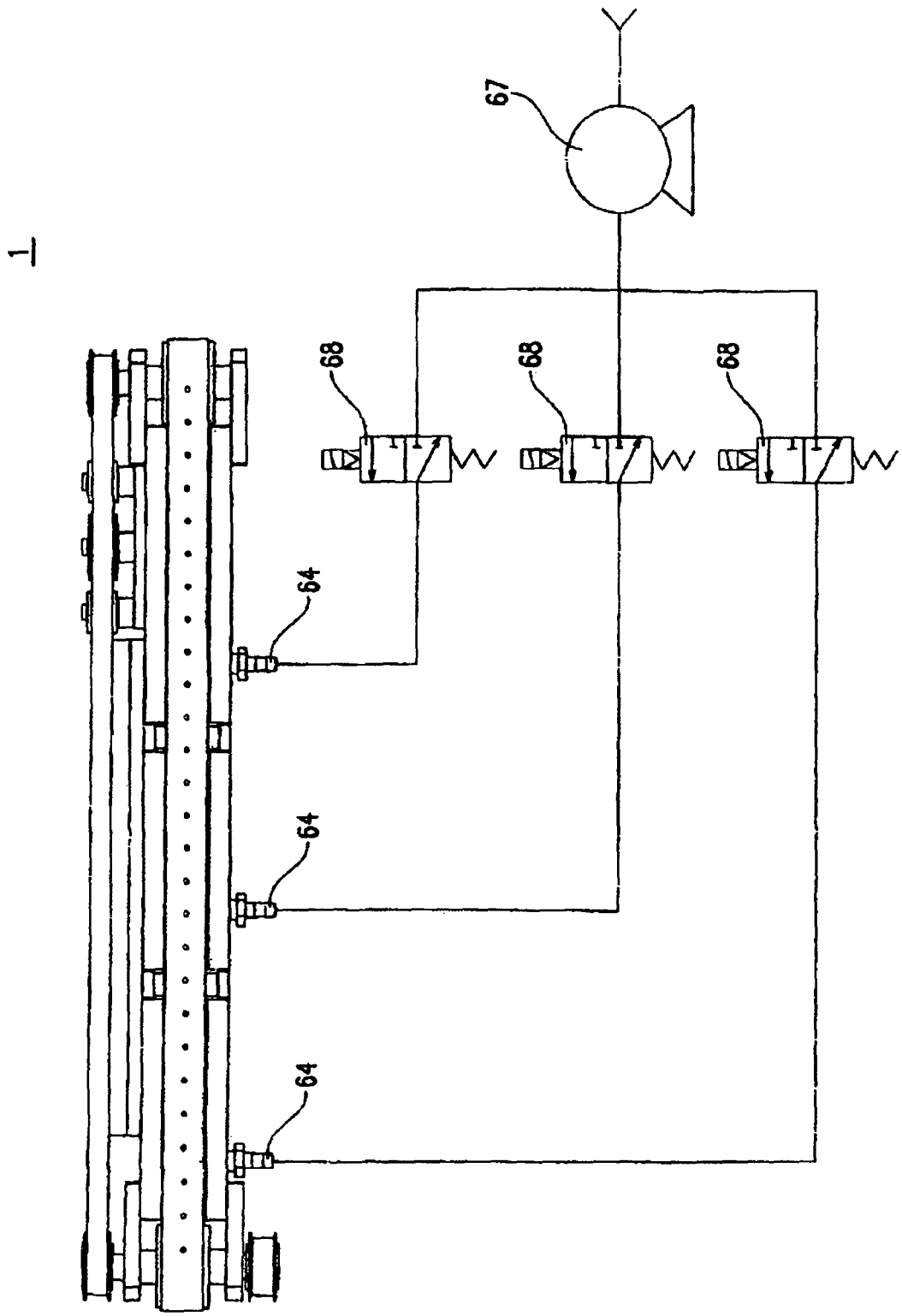

CONVEYOR AND CONVEYING DEVICE

CROSS-REFERENCE TO RELATED APPLICATIONS

This application is a U.S. national stage application of International Application No. PCT/JP2008/072619 filed Dec. 12, 2008, claiming a priority date of Jan. 10, 2008, and published in a non-English language.

SUMMARY OF THE INVENTION

1. Technical Field

The present invention relates to a conveyor that endlessly rotates a conveying member to convey a conveyance object, and a conveying device including a plurality of conveying members.

2. Background Art

Up to now, as a conveyor that endlessly rotates a conveying member to convey a conveyance object, as illustrated in FIG. 10, there has been known a conveyor 201 including a first rotation shaft (hereinafter referred to also as "drive shaft") 202, a second rotation shaft (hereinafter referred to also as "driven shaft") 203, and an elastic conveying member 204 that is looped around the drive shaft 202 and the driven shaft 203. The conveyor 201 is configured so that the conveying member 204 is brought into contact with the drive shaft 202 and the driven shaft 203 under pressure, and the conveying member 204 rotates endlessly due to a frictional force thereof.

Specifically, when the drive from a drive source (not shown) such as a motor is transmitted to the drive shaft 202, because the conveying member 204 and the drive shaft 202 are brought into contact with each other, the drive is transmitted from the drive shaft 202 by the conveying member 204. Further, because the driven shaft 203 and the conveying member 204 are brought into contact with each other, the drive is transmitted to the driven shaft 203 from the conveying member 204. Further, the conveyor 201 has a guide portion 205 that guides the conveying member 204 along a conveying direction, between the drive shaft 202 and the driven shaft 203.

However, in the above conveyor 201, for example, as illustrated in FIG. 11, when the outer peripheral portion of the drive shaft 202 is moved (displaced) by a given amount ($\Delta S1$), a site of the conveying member 204 which is brought into slide contact with the guide portion 205 may be partially expanded by a frictional force generated between the conveying member 204 and the guide portion 205 due to a load of an conveyance object X. As a result, the conveyance object X is moved by only a distance ($\Delta S2$) smaller than a movement distance ($\Delta S1$) of the drive shaft 202, and further the outer peripheral portion of the driven shaft 203 to which the drive is transmitted from the conveying member 204 is moved (displaced) by only a distance ($\Delta S3$) smaller than a movement distance ($\Delta S2$) of the conveyance object X.

That is, in the above conveyor 201, in transmitting the drive of the drive shaft 202 to the conveying member 204 and the driven shaft 203, when the elastic conveying member 204 is partially or entirely expanded and contracted, a movement amount of the drive shaft 202 is not accurately followed by a movement amount of the conveyance object X. Accordingly, in a device requiring that the movement amount of the drive shaft 202 is accurately followed by the movement amount of the conveyance object X (a required displacement and a real displacement), for example, in a device such as a printer or a scanner, an improvement in the performance is prevented by the above factor.

Accordingly, in view of the above circumstances, an object of the present invention is to provide a conveyor and a conveying device, which can allow the movement amount of the first rotation shaft to be accurately followed by the movement amount of the conveyance object.

SUMMARY OF THE INVENTION

According to the present invention, there is provided a conveyor including an elastic conveying member which is looped around at least a first rotation shaft and a second rotation shaft, and rotates endlessly through drive of the first rotation shaft, in which the conveyor further comprises transmitting means for transmitting the drive of the first rotation shaft to the second rotation shaft so that the first rotation shaft and the second rotation shaft are synchronized with each other.

According to the present invention, the transmitting means transmits the drive of the first rotation shaft to the second rotation shaft so that the first rotation shaft and the second rotation shaft are synchronous with each other, and the elastic conveying member, which is looped around at least the first rotation shaft and the second rotation shaft rotates endlessly due to the drive of the first rotation shaft. As a result, because the first rotation shaft and the second rotation shaft rotate in synchronization, the drive is transmitted to the conveying member from the respective first rotation shaft and second rotation shaft. Accordingly, as compared with the conventional conveyor that transmits the drive of the first rotation shaft to the second rotation shaft through the conveying member, the conveying member can be prevented from being partially or entirely expanded or contracted.

In the conveyor according to the present invention, the transmitting means may include a transmitting member, which is looped around at least the first rotation shaft and the second rotation shaft, and rotates endlessly so as to transmit the drive of the first rotation shaft to the second rotation shaft. According to such structure described above, the transmitting means allows the transmitting member, which is looped around at least the first rotation shaft and the second rotation shaft, and rotates endlessly, to transmit the drive of the first rotation shaft to the second rotation shaft. Accordingly, for example, a distance between the first rotation shaft and the second rotation shaft is flexibly designed.

In the conveyor according to the present invention, the conveying member may include suction means for sucking the conveyance object. According to such structure described above, because the suction means allows the conveying member to suck the conveyance object, the conveyance object can be prevented, when being conveyed, from being displaced on the conveying member (moved with respect to a contact site of the conveying member).

In the conveyor according to the present invention, there may be employed a structure in which the suction means includes a guide portion for guiding the conveying member along a conveying direction of the conveyance object; the conveying member includes a plurality of through-holes; and the guide portion includes a plurality of openings communicating with the through-holes in a site which guides the conveying member, and sucks air from the openings so as to suck the conveyance object to the conveying member. According to such structure described above, the guide portion for guiding the conveying member along the conveying direction of the conveyance object sucks air from a plurality of openings disposed in a site of the guide portion which guides the conveying member, to thereby suck the conveyance object to the conveying member through a plurality of through-holes disposed in the conveying member which communicate with the openings.

According to the present invention, there is provided a conveying device, including elastic conveying members being looped around at least first rotation shafts and second rotation shafts, respectively, and rotating endlessly through drive of the first rotation shafts, the elastic conveying members being arranged in parallel in a direction orthogonal to a conveying direction of a conveyance object so that the conveyance object is conveyed while being crossed over the conveying members, in which: the first rotation shafts are constructed so that the drive is synchronously transmitted to all of the first rotation shafts; and the conveying device further comprises transmitting means for transmitting the drive of the first rotation shafts to the second rotation shafts so that the first rotation shafts and the second rotation shafts are synchronized with each other.

According to the present invention, because the elastic conveying members each of which extends around at least the first rotation shaft and the second rotation shaft, and rotates endlessly due to the drive of the first rotation shaft, are disposed in parallel in a direction orthogonal to the conveying direction of the conveyance object, the conveyance object X are put across the respective conveying members, and conveyed. Further, because the transmitting means transmits the drive of the first rotation shaft to the second rotation shaft so that all of the first rotation shafts are synchronous with each other to transmit the drive, and the first rotation shaft and the second rotation shaft are synchronous with each other, the respective conveying members can be rotated in synchronism with each other while being prevented from being partially or entirely expanded or contracted.

In the conveying device according to the present invention, there may be employed a structure in which the plurality of conveying members are arranged spaced apart from each other; and support portions each including a planar portion are provided between the respective conveying members, the planar portion being arranged to be flush with or substantially flush with the conveying member. According to such structure described above, because the support portions are disposed between the respective conveying members which are arranged to be apart from each other so that the planar portions are flush or substantially flush with the conveying members, for example, a sheet-like conveyance object can be conveyed while ensuring the flatness due to the planar portions of the support portions and the conveying members.

In the conveying device according to the present invention, there may be employed a structure in which the respective conveying members includes suction means for sucking the conveyance object; each of the support portions is constructed to suck the conveyance object toward the planar portion; and the suction means is constructed to suck the conveyance object by force smaller than force for sucking the conveyance object to the conveying members so that the conveyance object is prevented from moving with respect to a sucked site of the conveying member. According to such structure described above, because the suction means sucks the conveyance object to the conveying member, and the support portions suck the conveyance object toward the planar portions, for example, a sheet-like conveyance object can be conveyed while more effectively ensuring the flatness. Further, because force of the support portions for sucking the conveyance object is smaller than force of the suction means for sucking the conveyance object to the conveying member, the conveyance object can be prevented from being displaced on the conveying member (moved with respect to a sucked site of the conveying member).

As described above, according to the conveyor of the present invention, for the purpose of preventing the conveying member from being partially or entirely expanded or contracted, there is provided such an advantageous effect of being capable of allowing the movement amount of the first rotation shaft and the movement amount of the conveyance object to be accurately followed.

Further, according to the conveying device of the present invention, because the plurality of conveying members arranged in the direction orthogonal to the conveying direction of the conveyance object rotate in synchronism with each other, while being prevented from being partially or entirely expanded or contracted, there is provided such an advantageous effect of being capable of allowing the movement amount of the first rotation shaft and the movement amount of the conveyance object to be accurately followed even in a case of a conveyance object which has a large width dimension (dimension in direction orthogonal to conveying direction of conveyance object).

BRIEF DESCRIPTION OF THE DRAWINGS

FIG. 3 are overall views illustrating the conveyor according to the embodiment, in which

FIG. 4 are overall views illustrating the conveyor according to the embodiment, in which FIG. 4A is a side view and FIG. 4B is a cross-sectional view taken along the line B-B of FIG. 3B.

FIG. 5 is an overall view illustrating the conveyor according to the embodiment, and is a diagram of an air system.

Figure 1:
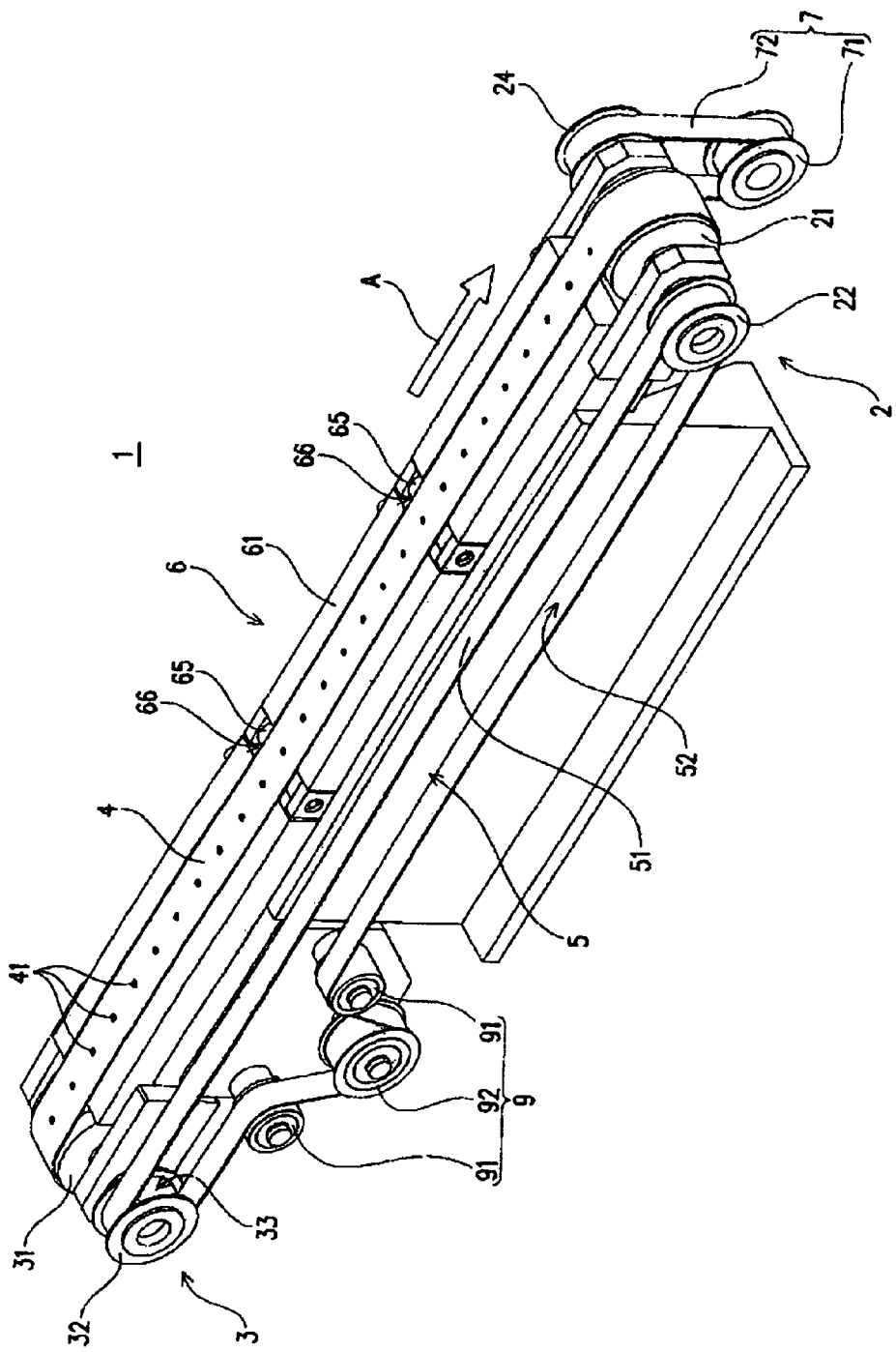
FIG. 1 is an overall view of a conveyor according to an embodiment of the present invention, and is a perspective view viewed from forward.
Figure 2:
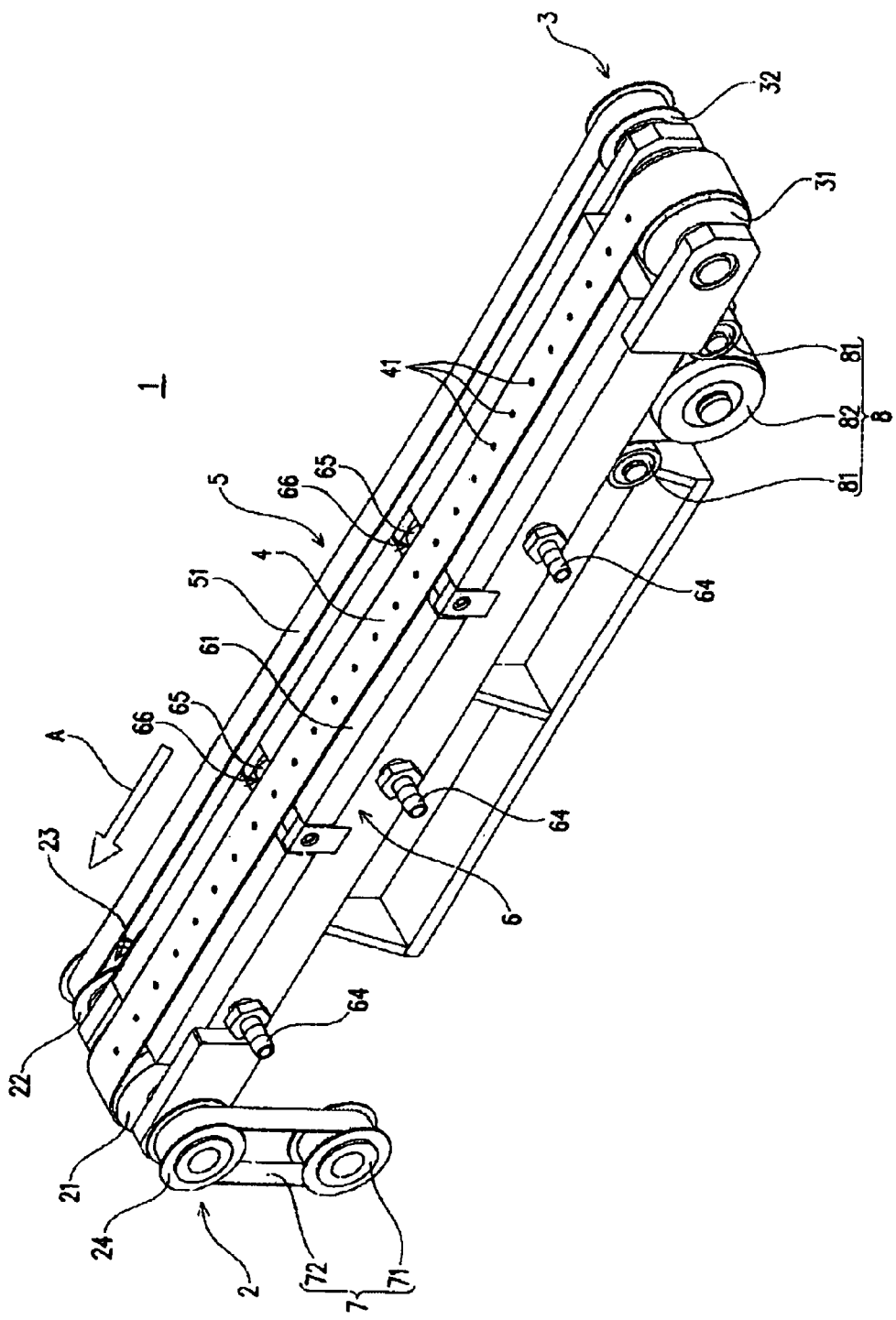
FIG. 2 is an overall view of the conveyor according to the embodiment of the present invention, and is a perspective view viewed from backward.
Figure 3A:
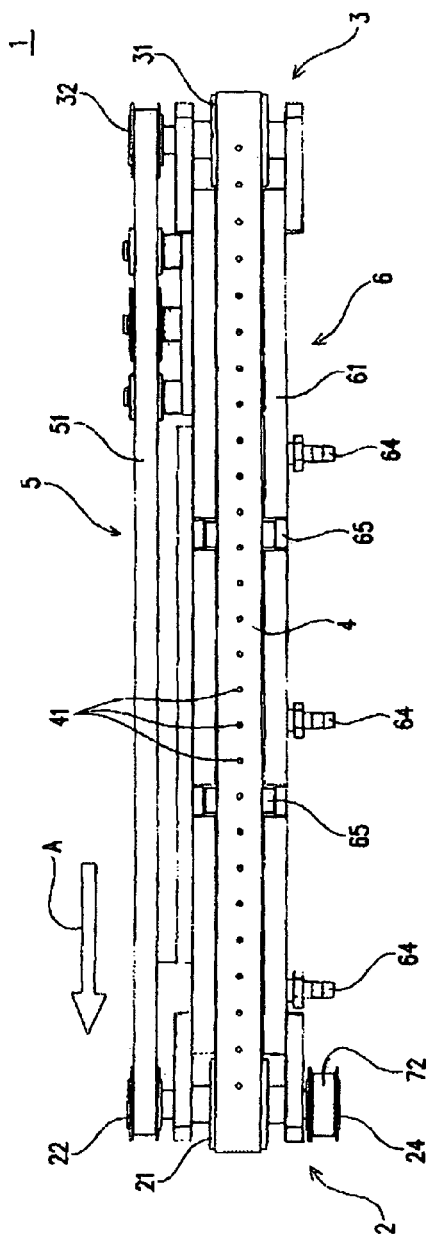
FIG. 3A is a plan view and FIG. 3B is a front view viewed from backward.
Figure 3B:
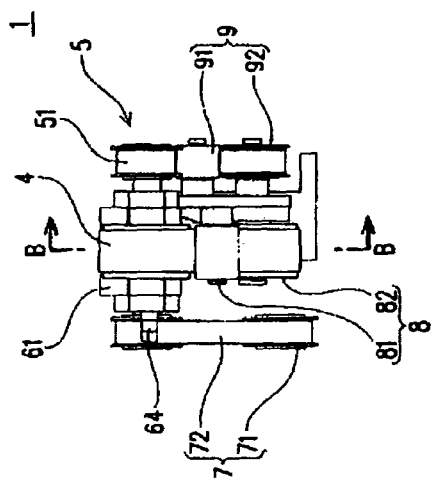

DESCRIPTION OF SYMBOLS 1 conveyor
2 first rotation shaft (drive shaft)
3 second rotation shaft (driven shaft)
4 conveying member
5 transmitting means
6 suction means
41 through-hole
51 transmitting member
61 guide portion 62 opening
100 conveying device
102 support portion
X conveyance object

DETAILED DESCRIPTION OF THE INVENTION

Hereinafter, a conveyor according to an embodiment of the present invention will be described with reference to FIGS. 1 to 5.

As illustrated in FIGS. 1 to 4, a conveyor 1 according to this embodiment includes an elastic conveying member 4 that is looped around at least a first rotation shaft (hereinafter referred to also as "drive shaft") 2 and a second rotation shaft (hereinafter referred to also as "driven shaft") 3, and rotates endlessly due to the drive of the first rotation shaft 2 (a direction indicated by an arrow A, that is, a conveying direction of a conveyance object in FIGS. 1 to 4). Specifically, the conveyor 1 includes the rotatable drive shaft 2, the rotatable driven shaft 3 disposed apart from the drive shaft, and an elastic conveying member 4 that has an inner peripheral portion being looped around the drive shaft 2 and the driven shaft 3 so as to come in contact (pressure contact) with the respective outer peripheral portions thereof, and rotates endlessly for conveying the conveyance object.

Further, the conveyor 1 further includes transmitting means 5 for transmitting the drive of the drive shaft (first rotation shaft) 2 to the driven shaft (second rotation shaft) 3 so that the drive of the drive shaft (first rotation shaft) 2 and the driven shaft (second rotation shaft) 3 are synchronous with each other. Specifically, the conveyor 1 further includes the transmitting means 5 for transmitting the drive of the drive shaft 2 to the driven shaft 3 so that the driven shaft 3 rotates in synchronism with the drive shaft 2 to which the drive is transmitted to rotate, and the drive is transmitted from the respective drive shaft 2 and driven shaft 3 to the conveying member 4.

Specifically, the transmitting means 5 includes a transmitting member 51 that is looped around at least the drive shaft 2 (the first rotation shaft) and the driven shaft (the second rotation shaft) 3, and rotates endlessly so as to transmit the drive of the drive shaft (the first rotation shaft) 2 to the driven shaft (the second rotation shaft) 3. More specifically, the transmitting means 5 includes the transmitting member 51 including an inner peripheral portion being looped around the drive shaft 2 and the driven shaft 3 so as to be brought into contact with the respective outer peripheral portions thereof, and rotates endlessly so that the drive of the drive shaft 2 is transmitted to the driven shaft 3.

The conveyor 1 includes suction means 6 for sucking the conveyance object to the conveying member 4. Specifically, the conveyor 1 is so configured as to suck or draw by suction the conveyance object to the outer peripheral portion of the conveying member 4. More specifically, the conveyor 1 includes a guide portion 61 that guides the conveying member 4 along a conveying direction of the conveyance object, and the conveying member 4 has a plurality of through-holes 41. On the other hand, the guide portion 61 has a plurality of openings 62 that communicate with the plurality of through-holes 41 on a site that guides the conveying member 4, and is constructed to suck air from the plurality of openings 62 so as to suck the conveyance object to the conveying member 4.

The drive shaft 2 includes a drive shaft first direction change member (hereinafter referred to also as "drive shaft first pulley") 21 including an outer peripheral portion that is brought into contact with the inner peripheral portion of the conveying member 4 to change the direction. Further, the drive shaft 2 includes a drive shaft second direction change member (hereinafter referred to also as "drive shaft second pulley") 22 including an outer peripheral portion that is brought into contact with the inner peripheral portion of the transmitting member 51 to change the direction. Specifically, the drive shaft 2 includes the drive shaft second pulley 22 including a concave-convex engaging portion 23 (concave-convex shape not shown) on the outer peripheral portion thereof.

The conveyor 1 includes drive receiving means 7 for transmitting the drive from a drive source (not shown) such as a motor to the drive shaft 2. Specifically, the drive transmitting means 7 includes a drive receiving second pulley 71 that transmits the drive from the drive source to the drive receiving first pulley 24 disposed in the drive shaft 2, and a drive receiving belt 72 that transmits the drive (rotation) of the drive receiving second pulley 71 to the drive receiving first pulley 24.

The driven shaft 3 includes a driven shaft first direction change member (hereinafter referred to also as "driven shaft first pulley") 31 including an outer peripheral portion that is brought into contact with the inner peripheral portion of the conveying member 4 to change the direction. Specifically, the driven shaft 3 includes the driven shaft first pulley 31 including the same diameter (or the same configuration) as that of the drive shaft first pulley 21. Further, the driven shaft 3 includes a driven shaft second direction change member (hereinafter referred to also as "driven shaft second pulley") 32 including an outer peripheral portion that is brought into contact with the inner peripheral portion of the conveying member 51 to change the direction. Specifically, the driven shaft 3 includes the driven shaft second pulley 32 including the same diameter (or the same configuration) as that of the drive shaft second pulley 22. More specifically, the driven shaft 3 includes the driven shaft second pulley 32 having an engaging portion 33 whose outer peripheral portion is concave-convex (concave-convex shape not shown).

The conveying member 4 is constructed to rotate endlessly along a conveyance path of the conveyance object, that is, with a site along the conveyance path of the conveyance object. Specifically, the conveying member 4 is constructed to form the conveyance path on an upper side thereof, and allows the conveyance object to be put thereon for conveyance. Further, the conveying member 4 is shaped as a flexible flat belt. The conveying member 4 has a plurality of through-holes 41 at given intervals in the circumferential direction. Specifically, the conveying member 4 has the plurality of through-holes 41, which are uniserial in the width direction, arranged in parallel in the circumferential direction.

The conveyor 1 includes first tension adjusting means 8 that can adjust a pressure under which the conveying member 4 is brought into contact with the drive shaft 2 and the driven shaft 3 so as to prevent slippage from occurring between the conveying member 4 and the drive shaft 2 (the drive shaft first pulley 21), and between the conveying member 4 and the driven shaft 3 (the driven shaft first pulley 31). Specifically, the first tension adjusting means 8 includes a pair of fixed pulleys 81, 81 around which the conveying member 4 extends, and a displacement pulley 82 that can be displaced between the pair of fixed pulleys 81, 81. More specifically, the first tension adjusting means 8 includes the pair of fixed pulleys 81, 81 whose outer peripheral portions are brought into contact with the outer peripheral portion of the conveying member 4, and the displacement pulley 82 whose outer peripheral portion is brought into contact with the inner peripheral portion of the conveying member 4 between sites of the conveying member 4 which are brought into contact with the pair of fixed pulleys 81, 81.

The transmitting member 51 is constructed to rotate endlessly in parallel to the conveying member 4. Specifically, the transmitting member 51 makes the inner peripheral portion come in contact (press-contact) with the outer peripheral portions of the drive shaft second pulley 22 and the driven shaft second pulley 32 to rotate endlessly. The transmitting member 51 includes, on the inner peripheral portion thereof, an engaged portion 52 including a concavo-convex shape (the concavo-convex shape not shown) corresponding to the engaging portion 23 of the drive shaft second pulley 22 and the engaging portion 33 of the driven shaft second pulley 32. The engaged portion 52 is constructed to be engageable with the respective engaging portions 23 and 33 so as to prevent slippage from occurring between the transmitting member 51 and the drive shaft second pulley 22 and between the transmitting member 51 and the driven shaft second pulley 32. The transmitting member 51 is a timing belt.

Further, the transmitting member 51 is constructed to transmit the drive from the drive shaft 2 (the drive shaft second pulley 22) to the driven shaft 3 (the driven shaft second pulley 32) before or simultaneously when the conveying member 4 transmits the drive of the drive shaft 2 (the drive shaft first pulley 21) to the driven shaft 3 (the driven shaft first pulley 31). Specifically, the transmitting member 51 is constructed to make the stretch property smaller than that of the conveying member 4 when conveying the conveyance object. For example, the transmitting member 51 can be made of a material smaller in the stretch property than the conveying member 4, can be larger in thickness than the conveying member 4, or can be formed by incorporating a reinforcement material into the conveying member 4.

The conveyor 1 includes second tension adjusting means 9 that can adjust a pressure under which the transmitting member 51 is brought into contact with the drive shaft 2 and the driven shaft 3 so as to prevent slippage (skip between the engaging portions 23, 33 and the engaged portion 52) from occurring between the transmitting member 51 and the drive shaft 2 (the drive shaft second pulley 22), and between the transmitting member 51 and the driven shaft 3 (the driven shaft second pulley 32). Specifically, the second tension adjusting means 9 includes a pair of fixed pulleys 91, 91 around which the transmitting member 51 extends, and a displacement pulley 92 that can be displaced between the pair of fixed pulleys 91, 91. More specifically, the second tension adjusting means 9 includes the pair of fixed pulleys 91, 91 whose outer peripheral portions are brought into contact with the outer peripheral portion of the transmitting member 51, and the displacement pulley 92 whose outer peripheral portion is brought into contact with the inner peripheral portion of the transmitting member 51 between sites of the transmitting member 51 which are brought into contact with the pair of fixed pulleys 91, 91.

The guide portion 61 is arranged between the drive shaft 2 and the driven shaft 3, and along the conveyance path of the conveyance object. The guide portion 61 is formed to be larger in width dimension than the conveying member 4, and guides the conveying member 4 by allowing a part of an upper surface portion of the guide portion 61 arranged along the conveyance path so as to be brought into slide contact with the conveying member 4. Further, the guide portion 61 has the plurality of openings 62 arranged in parallel in the conveying direction of the conveyance object (nine in FIG. 4). Further, the guide portion 61 has a plurality of communication portions 63 that are communicated with the plurality of openings 62 (three communication portions 63 that communicate with three openings 62 in FIG. 4).

Further, the guide portion 61 has a plurality of connection members 64 that communicate with the plurality of openings 62. Specifically, the guide portion 61 includes, on the upper surface side thereof, a receiving portion 66 for receiving a rotator 65 that is brought into contact with the conveying member 4 (around which the conveying member 4 extends). Specifically, the guide portion 61 has a plurality of receiving portions 66, 66 arranged between the respective communication portions 63 (two in FIGS. 1 to 4).

The suction means 6 includes sucking-out means 67 such as a vacuum pump, which is connected to the connection members 64 as illustrated in FIG. 5, so as to suck air from the plurality of openings 62 through the communication portions 63 and the connection members 64. Specifically, the respective connection members 64 are connected to the sucking-out means 67 through pipes. Further, respective valves 68 are disposed between the respective connection members 64 and the sucking-out means 67 so as to change a region where the conveyance object is sucked.

The configuration of the conveyor 1 according to this embodiment has been described above, and the operation of the conveyor 1 according to this embodiment will be described below.

When the drive receiving second pulley 71 is rotated by transmitting the drive of the drive source (motor), the drive receiving belt 72 transmits the drive (rotation) of the drive receiving second pulley 71 to the drive receiving first pulley 24. As a result, because the drive receiving first pulley 24 disposed in the drive shaft 2 rotates, the drive shaft 2, that is, the drive shaft first pulley 21 and the drive shaft second pulley 22 rotate.

When the drive shaft first pulley 21 rotates, the drive is transmitted to the conveying member 4 that is brought into contact with the drive shaft first pulley 21, and when the drive shaft second pulley 22 rotates, the drive is transmitted to the transmitting member 51 that is brought into contact with the drive shaft second pulley 22. With the above operation, the driven shaft second pulley 32 that is brought into contact with the transmitting member 51 which rotates endlessly rotates.

In this situation, a site of the conveying member 4 having elasticity (stretch property) between the drive shaft 2 and the driven shaft 3 and along the conveyance path of the conveyance object may be stretched due to a friction with the guide portion 61. However, because the driven shaft first pulley 31 rotates with rotation of the driven shaft second pulley 32 due to the transmitting member 51, the drive is transmitted to the conveying member 4 that is brought into contact with the driven shaft first pulley 31. Accordingly, the transmitting member 51 transmits the drive to the driven shaft second pulley 32, that is, the driven shaft first pulley 31 before the conveying member 4 transmits the drive to the driven shaft first pulley 31. As a result, the drive is transmitted to the conveying member 4 from the drive shaft first pulley 21, and also the drive is transmitted to the conveying member 4 from the driven shaft first pulley 31 that rotates in synchronism with the drive shaft first pulley 21, the expansion and contraction of the site along the conveyance path of the conveyance object are regulated.

Further, because the engaged portion 52 of the transmitting member 51 is engaged with the respective engaging portions 23 and 33 of the drive shaft second pulley 22 and the driven shaft second pulley 32, slippage is prevented from occurring between the transmitting member 51 and the drive shaft second pulley 22 and between the transmitting member 51 and the driven shaft second pulley 32. As a result, because the drive shaft second pulley 22 and the driven shaft second pulley 32, that is, the drive shaft 2 and the driven shaft 3 rotate more accurately in synchronism with each other, in the conveying member 4 that is brought into contact with the drive shaft first pulley 21 and the driven shaft first pulley 31 to rotate endlessly, the expansion and contraction of the site along the conveyance path of the conveyance object is further regulated.

Accordingly, the movement of the conveying member 4 accurately follows the movements of the drive shaft 2 and the driven shaft 3. When the conveying member 4 is not stretched by a friction with the guide portion 61, the conveying member 4 transmits the drive to the driven shaft first pulley 31 simultaneously or substantially simultaneously when the conveyor 1 transmits the drive to the driven shaft second pulley 32, that is, the conveying member 4 and the transmitting member 51 transmits the drive of the drive shaft 2 to the driven shaft 3 simultaneously or substantially simultaneously.

The upper surface portion of the guide portion 61 arranged between the drive shaft 2 and the driven shaft 3 and also along the conveyance path is brought into slide contact with the conveying member 4 to guide the conveying member 4 and convey the conveyance object put on the conveying member 4 in the conveying direction. In this situation, the sucking-out means 67 sucks out air in the communication portions 63 through the pipes and the connection members 64. Therefore, the conveyance object put on the conveying member 4 is sucked to the outer peripheral portion of the conveying member 4 through the plurality of openings 62 in the guide portion 61 and the plurality of through-holes 41 in the conveying member 4. As a result, the conveyance object X is prevented from being displaced on the conveying member 4.

Further, the valves 68 disposed between the connection members 64 and the sucking-out means 67 are opened or closed to suck air in each given region (each of the openings 62 communicating with the communication portions 63). Therefore, a region where the conveyance object is sucked to the outer peripheral portion of the conveying member 4 can be changed. As a result, because the respective valves 68 are opened and closed in correspondence with the region where the conveyance object exists due to detecting means (not shown) or the like, the conveyance object X is sucked in only a necessary region of the conveying member 4. With this configuration, because the frictional force generated between the conveying member 4 and the guide portion 61 can be reduced, the expansion and contraction of the conveying member 4 can be regulated.

With the above configuration, in the conveyor 1 according to this embodiment, because the transmitting member 51 (transmitting means 5) transmits the drive of the drive shaft 2 (the first rotation shaft) 2 to the driven shaft (the second rotation shaft) 3, the drive shaft 2 and the driven shaft 3 rotate in synchronism with the result that the drive is transmitted to the conveying member 4 from the respective drive shaft 2 and driven shaft 3. Accordingly, because the conveying member 4 can be prevented from being partially or entirely expanded or contracted, the movement amount of the drive shaft 2 can be accurately followed by the movement amount of the conveyance object.

Further, in the conveyor 1 according to this embodiment, the transmitting member 51 that is looped around the drive shaft 2 and the driven shaft 3 and rotates endlessly transmits the drive of the drive shaft 2 to the driven shaft 3. Accordingly, for example, because the tension of the conveying member 4 can be adjusted by the first tension adjusting means 8, and the transmitting member 51 can be adjusted by the second tension adjusting means 9, the tensions suitable for the respective members can be provided.

Further, in the conveyor 1 according to this embodiment, because air is sucked from the plurality of openings 62 in the guide portion 61 by the aid of the sucking-out means 67, the conveyance object X can be sucked to the conveying member 4 through the plurality of through-holes 41 disposed in the conveying member 4 communicating with the plurality of openings 62. Accordingly, the conveyance object can be prevented, when being conveyed, from being displaced on the conveying member 4.

Figure 6:
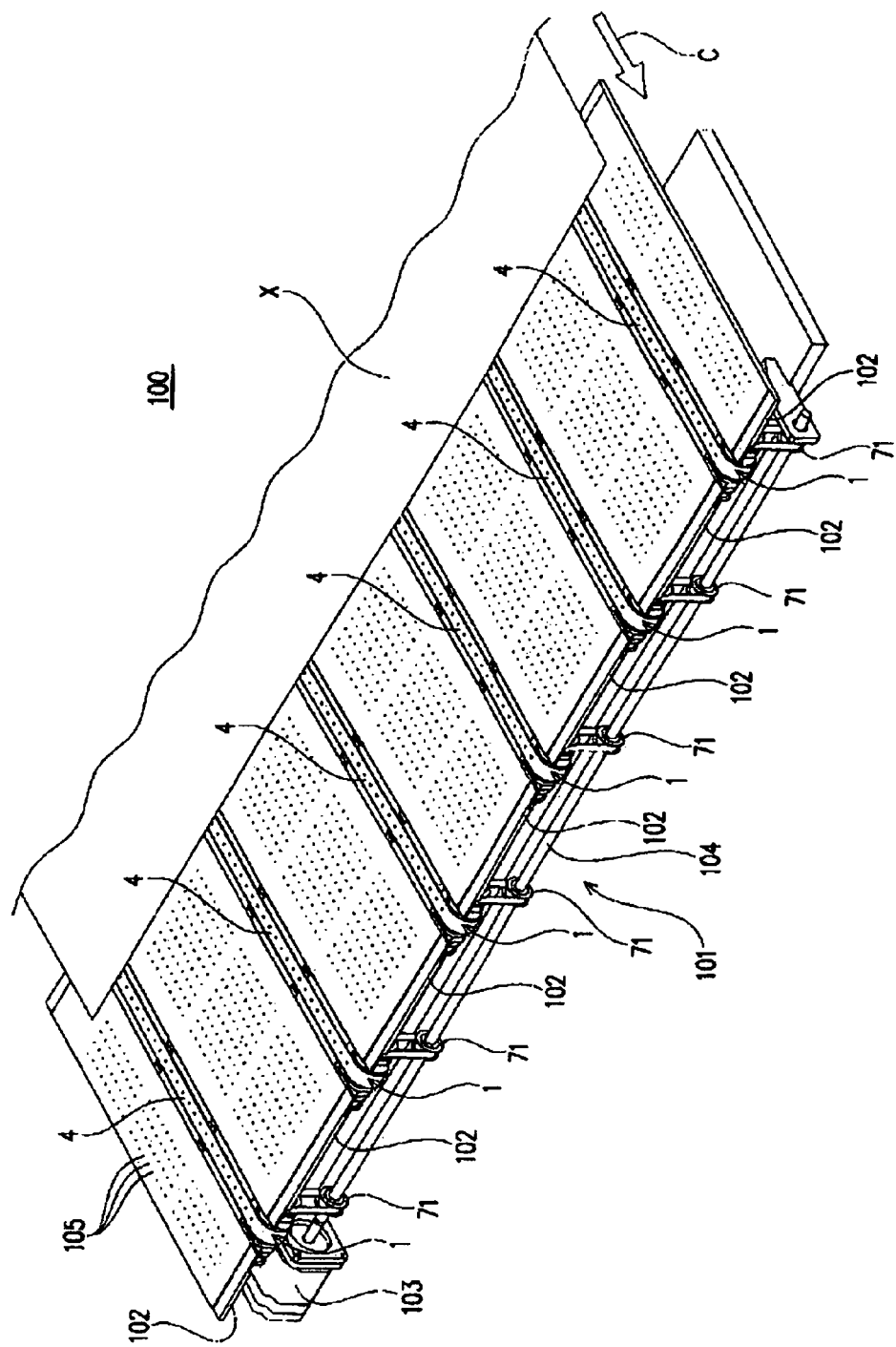
FIG. 6 is an overall view illustrating a conveying device according to an embodiment of the present invention, and is a perspective view.
Figure 7:
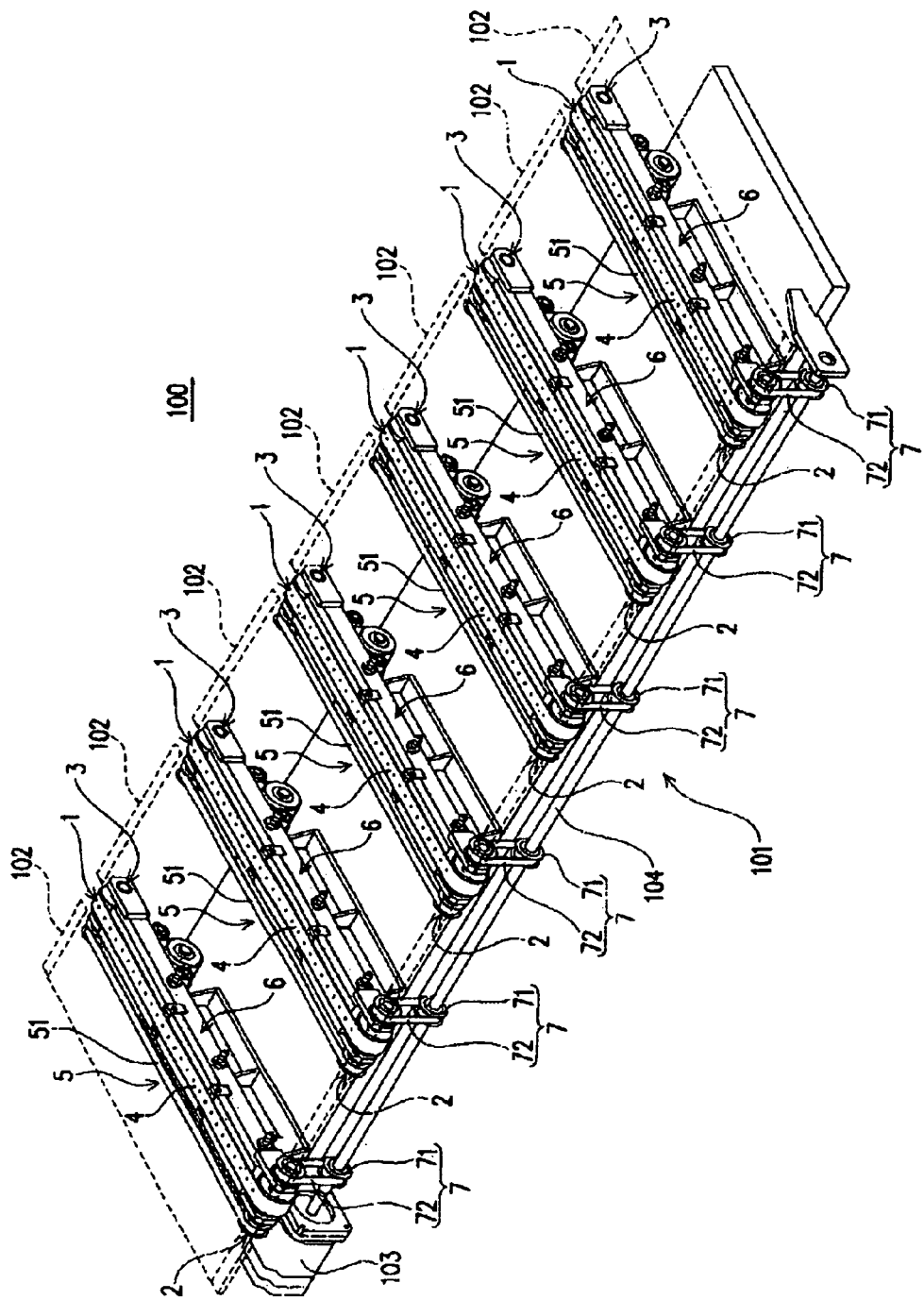
FIG. 7 is an overall view illustrating the conveying device according to the embodiment of the present invention, and is a partial perspective view of an inside thereof.
Figure 8:
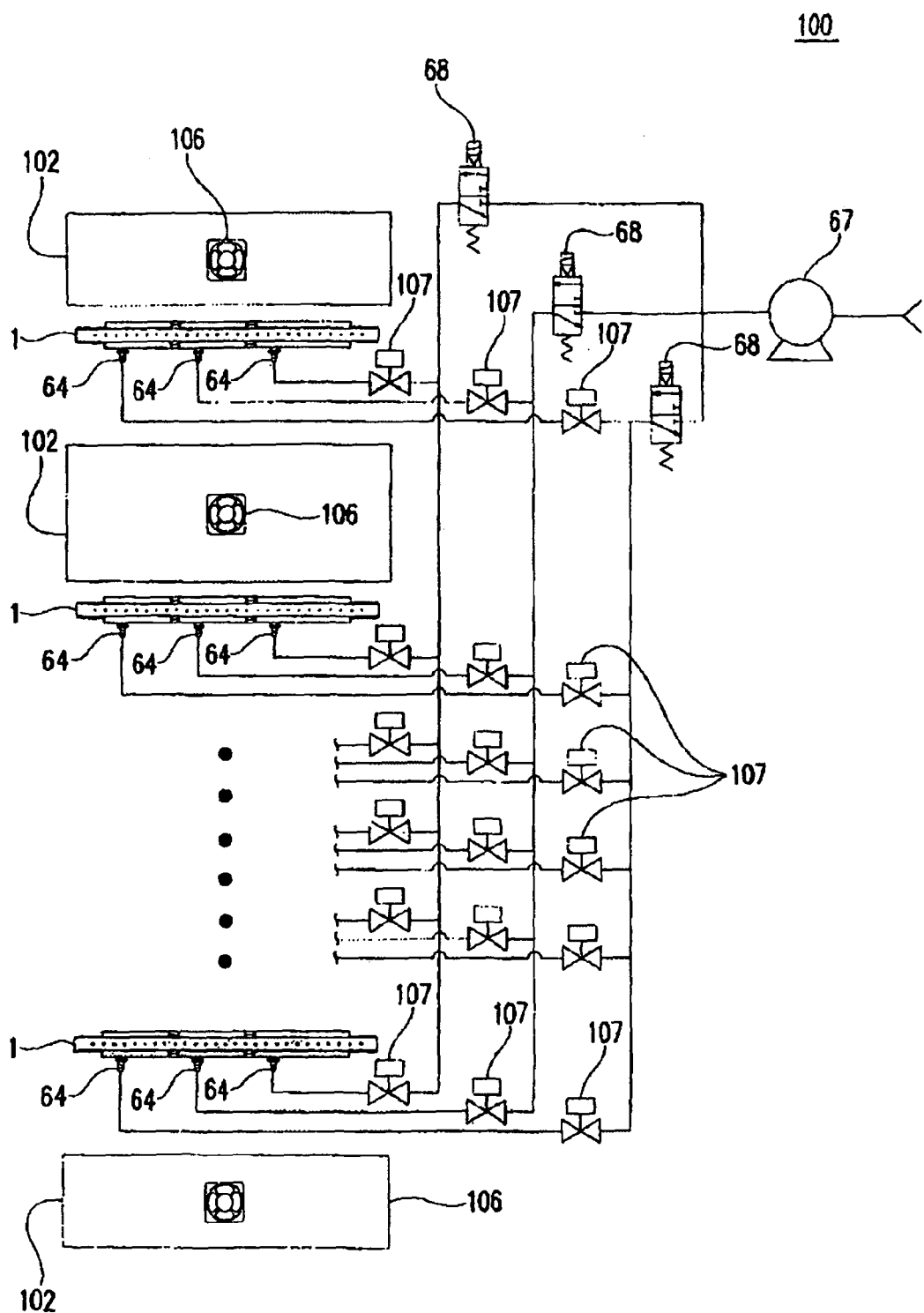
FIG. 8 is an overall view illustrating the conveying device according to the embodiment, and is a diagram of an air system.

Subsequently, a conveying device according to an embodiment of the present invention will be described with reference to FIGS. 6 to 8. In FIGS. 6 to 8, parts denoted by the same symbols as those in FIGS. 1 to 5 represent the identical configurations or elements with the conveyor 1 in the above embodiment shown in FIGS. 1 to 5.

As illustrated in FIGS. 6 and 7, in a conveying device 100 according to this embodiment, the elastic conveying members 4 is each looped around at least the drive shaft (the first rotation shaft) 2 and the driven shaft (the second rotation shaft) 3, and drive endlessly due to the drive of the drive shaft (the first rotation shaft) 2. The conveying members 4 are arranged in parallel in a direction orthogonal to the conveying direction (a direction indicated by an arrow C in FIG. 6) of the conveyance object X so as to convey the conveyance object X put across the conveying members 4 (six in FIGS. 6 and 7). Specifically, the plurality of conveying members 4 are arranged apart from each other.

More specifically, the plurality of conveying members 4 are arranged in parallel so that the shaft lines of the respective drive shafts 2 coincide with each other, and the shaft lines of the driven shafts 3 coincide with each other. The conveying device 100 is set to about 1,800 mm in a direction (width direction) orthogonal to the conveying direction of the conveyance object X so as to convey the conveyance object X of B0 size (1030 mm long and 1,456 mm wide).

Further, the conveying device 100 further includes the plurality of transmitting means 5 for transmitting the drive of the drive shaft (the first rotation shaft) 2 to the driven shaft (the second rotation shaft) 3. The conveying device 100 includes a plurality of suction means 6 for sucking the conveyance object X to the respective conveying members 4. That is, in the conveying device 100, the plurality of conveyors 1 are arranged in parallel in the direction orthogonal to the conveying direction of the conveyance object X so as to convey the conveyance object put across the respective conveying members 4. Further, the conveying device 100 is configured so that all of the drive shafts (the first rotation shafts) 2 are synchronized with each other to transmit the drive. Specifically, the conveying device 100 includes synchronizing means 101 for transmitting the drive to the respective drive shafts 2 so as to synchronize all of the drive shafts 2 with each other.

In addition, the conveying device 100 includes a plurality of support portions 102 (seven in FIGS. 6 and 7) including respective planar portions which are flush or substantially flush with the conveying members 4 disposed in parallel, arranged between the respective conveying members 4. Specifically, the conveying device 100 includes a plurality of plate support portions 102 larger in width dimension than the conveyors 1 (the conveying members 4) so as to put the sheet-like conveyance object X across the planar portions each formed in a plane and the conveying members 4 to ensure the flatness of the conveyance object.

The synchronizing means 101 includes a drive transmission shaft 104 that transmits the drive directly from the drive source 103 such as a motor, and the drive transmission shaft 104 transmits the drive to the respective drive shafts 2 through the drive transmitting means 7 of the respective conveyors 1 so as to synchronize the drive shafts 2 of the respective conveyors 1 with each other to transmit the drive. Specifically, the synchronizing means 101 includes the drive transmission shaft 104 equipped with the respective drive receiving second pulleys 71, and the drive receiving belts 72 that transmit the drive to the respective drive shafts 2 from the respective drive receiving second pulleys 71.

Each of the support portions 102 is formed so that a frictional force occurring between the planar portion and the conveyance object X is smaller than a frictional force occurring between the conveying member 4 and the conveyance object X so as to regulate the occurrence of the frictional force between the support portion 102 and the conveyance object X. The support portions 102 are constructed to suck the conveyance object toward the respective planar portions. Specifically, the support portions 102 are each constructed to include a plurality of holes 105 in the planar portion so as to suck air from the plurality of holes 105 to suck the conveyance object X.

Further, the support portions 102 are each configured so that the suction means 6 sucks the conveyance object X by force smaller than force for sucking the conveyance object to the conveying member 4 so as to prevent the conveyance object X from being displaced on the conveying member 4. Specifically, each of the support portions 102 includes suction means 106 such as a fan for sucking air from the respective holes 105, which is internally communicated with the plurality of holes 105 formed in substantially the entire surface of the planar portion (refer to FIG. 8). More specifically, each support portion 102 includes the suction means 106 having force for sucking out air, which is smaller than that of the sucking-out means 67 of the conveyor 1.

Further, in the conveying device 100, as illustrated in FIG. 8, the sucking-out means 67 and the respective valves 68 are shared by the respective conveyors 1. Further, the conveying device 100 includes terminal valves 107 between the respective connection members 64 and the respective valves 68 so as to select the conveyor 1 which is available to suck.

The configuration of the conveying device 100 according to this embodiment has been described above. Subsequently, the operation of the conveying device 100 according to this embodiment will be described. Hereinafter, a case in which the conveying device 100 conveys the sheet-like conveyance object X will be described.

In the conveying device 100, because the plate support portions 102 having a width dimension larger than the width dimension of the conveying members 4 are arranged so that the planar portions are flush or substantially flush with the conveying members 4, the conveyance object X is crossed over the planner portions of the support portions 102 and the outer peripheral portions of the conveying members 4. Then, through the suction of the air from the plurality of holes 105 formed in the planar portions of the support portions 102 by the suction means 106, the support portions 102 suck the conveyance object X toward the planner portion.

In addition, because the suction means 6 sucks the conveyance object X placed on the conveying members 4 to the conveying members 4, the flatness of the sheet-like conveyance object X is ensured. Note that, because the force for sucking the conveyance object X toward the planar portions by the support portions 102 is smaller than the force for sucking the conveyance object X to the conveying members 4 by the suction means 6, the flatness of the sheet-like conveyance object X is ensured while preventing the conveyance object X from being displaced on the conveying members 4.

When the drive is transmitted to the drive transmission shaft 104 from the drive source 103 to rotate the drive transmission shaft 104, the respective drive receiving second pulleys 71 rotate. As a result, all of the respective drive shafts 2 in the plurality of conveyors 1 are synchronized with each other through the respective drive receiving belts 72, the drive is transmitted to the respective drive shafts 2, and the drive shafts 2 rotate. In this case, in the conveyor 1, because the transmitting members 51 transmit the drive to the driven shafts 3 so that the drive shafts 2 and the driven shafts 3 are synchronized with each other, the drive is transmitted to the conveying members 4 from the respective drive shafts 2 and driven shafts 3. Accordingly, the respective conveying members 4 rotate in synchronization while being prevented from being partially or entirely expanded or contracted.

The respective valves 68 disposed between the connection members 64 and the sucking-out means 67 are opened or closed to change a region in which the conveyance object X is sucked to the conveying members 4. Further, the respective terminal valves 107 disposed between the respective connection members 64 and the respective valves 68 are opened or closed to select (change) the conveyor 1 to be sucked to the conveying members 4. As a result, because the respective valves 68 and the respective terminal valves 107 are opened or closed in correspondence with a region in which the conveyance object X exists, the conveyance object X is sucked in only a necessary region of the conveying members 4.

As described above, in the conveying device 100 according to this embodiment, all of the drive shafts 2 are synchronized with each other to transmit the drive, and the transmitting means 5 transmits the drive of the drive shafts 2 to the respective driven shafts 3. Therefore, the plurality of conveying members 4 aligned in the direction orthogonal to the conveying direction of the conveyance object X can rotate in synchronism with each other while being prevented from being partially or entirely expanded or contracted. Accordingly, in the conveyance object X large in the width dimension (a dimension in the direction orthogonal to the conveying direction of the conveyance object), the movement amount of the drive shafts 2 can be accurately followed by the movement amount of the conveyance object.

Accordingly, because a precision in the conveyance of the conveyance object X, for example, a precision in reciprocating feed can be improved, a joint treatment (an end treatment in image printing across the plurality of conveyance objects X) can be conducted according to a relation with output data. Further, because the conveyance object X can be stably conveyed without deterioration of precision, for example, during intermittent operation in a printer, a high-quality image can be obtained.

Further, for example, in the conventional conveying device that can convey the conveyance object X of B0 size by one conveying member (belt) large in width dimension, because the width dimension is large, it is difficult to apply equal tensions between the conveying member and the drive shaft, and between the conveying member and the driven shaft, resulting in such a problem that the conveying members are partially expanded or contracted to be snaked. On the other hand, in the conveying device 100 according to this embodiment, the conveyors 1 each having the conveying member 4 designed to an appropriate width dimension are arranged in parallel so as to prevent the above problem from occurring. Moreover, for example, when the conveying member 4 is to be exchanged due to aging degradation, because the conveying member 4 is designed to the appropriate width dimension, exchange is easy, and the maintenance time can be reduced.

Further, in the conveying device 100 according to this embodiment, because the planar portions of the support portions 102 are arranged between the respective conveying members 4 so as to be flush or substantially flush with the conveying members 4, when the conveyance object X is put across the planar portions of the respective support portions 102 and the outer peripheral portions of the respective conveying members 4, for example, the sheet-like conveyance object X can be conveyed while the flatness is ensured.

In the conveying device 100 of this embodiment, because the suction means 6 sucks the conveyance object X to the conveying member 4, and the support portions 102 suck the conveyance object X toward the planar portions, the sheet-like conveyance object can be conveyed while further ensuring the flatness. In addition, because the force of the support portions 102 for sucking the conveyance object X is smaller than force of the suction means 6 for sucking the conveyance object X to the conveying member 4, the conveyance object X can be prevented from being displaced on the conveying member 4.

Figure 10:
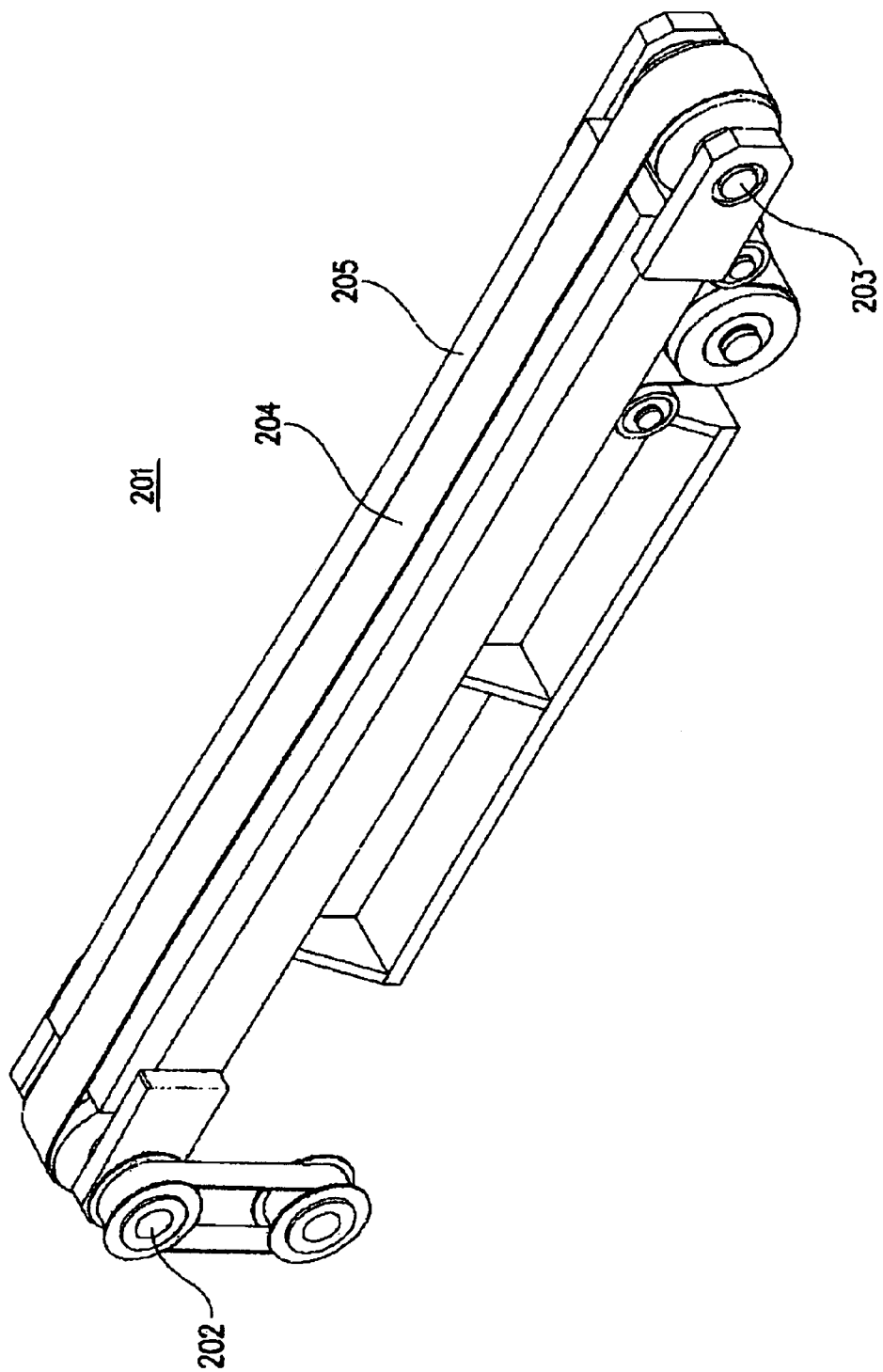
FIG. 10 is an overall view illustrating a conventional conveying device, and is a perspective view.
Figure 11:
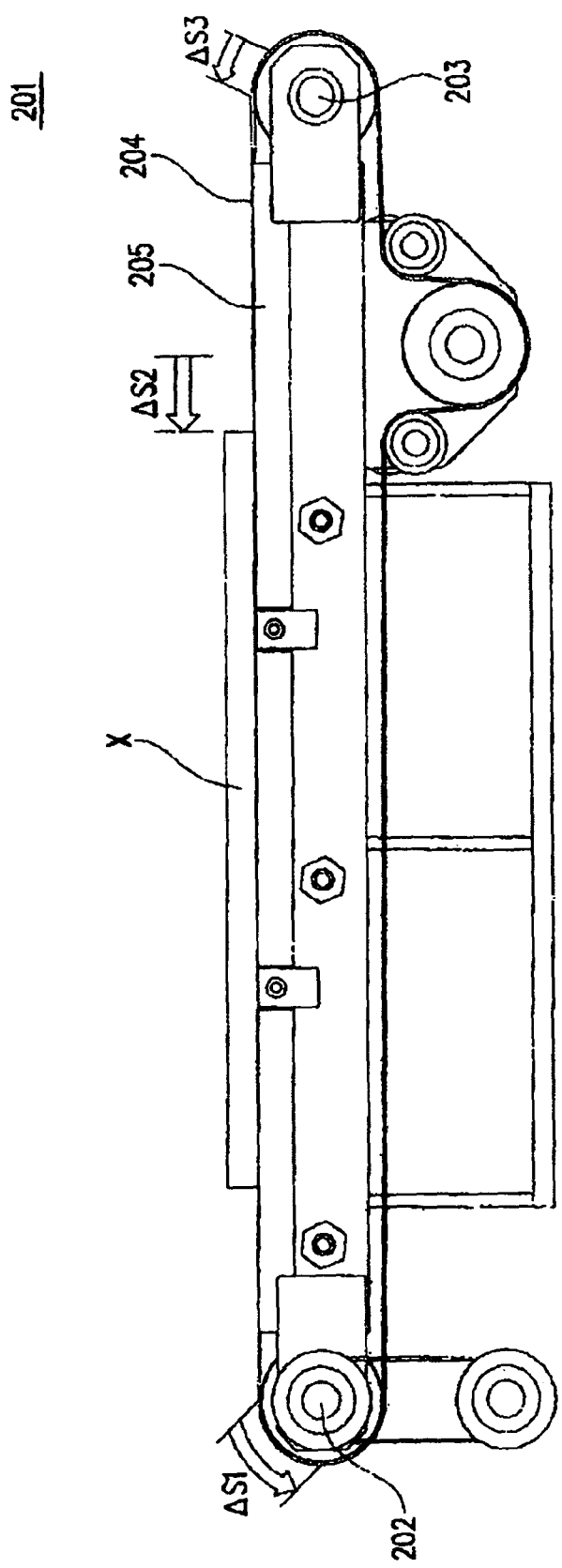
FIG. 11 is an overall view illustrating the conventional conveying device, and is a side view.

Accordingly, as compared with the conventional conveying device (conveyor 201) in which the conveyance object X is not sucked to the conveying member 204 as illustrated in FIGS. 10 and 11, the conveying device 100 (the conveyor 1) according to this embodiment can convey a curved sheet-like conveyance object X while correcting the conveyance object X to ensure the flatness thereof.

Further, as compared with the conventional conveying device that conveys the conveyance object X while the conveyance object X is pressed by a pair of rollers disposed to put the conveyance object X therebetween, because the conveyance object X can be conveyed without contacting with one surface (lower surface) of the conveyance object X, for example, the conveyance object X having one surface (gloss surface) to be printed by a printer, which undesirably is brought into contact with a roller or the like can be stably conveyed without deterioration of precision. As a result, a high-quality image or the like can be obtained.

The conveyor 1 and the conveying device 100 according to the present invention are not limited to the above-mentioned embodiments, but can be variously modified without departing from the subject matter of the present invention.

In the conveyor 1 and the conveying device 100 according to the present invention, as detecting means for opening or closing the valves 68 and the terminal valves 107 in correspondence with a region in which the conveyance object X exists, for example, a sensor (photoelectric sensor, limit switch, or the like) for detecting a position of the conveyance object X may be applied. Specifically, the sensors can be arranged at given intervals in the conveying direction to detect the region in which the conveyance object X exists in the conveying direction. Further, in the conveying device 100 in which the plurality of conveying members 4 are arranged in parallel, the sensors can be arranged on the conveyance inlet at given intervals in the width direction (a direction orthogonal to the conveying direction) to detect the region in which the conveyance object X exists in the width direction.

Further, for example, a displacement detection sensor (for example, encoder) can be fitted to the rotator 65 disposed in the guide portion 61 so as to be brought in contact with the conveying member 4 to rotate. With this configuration, the region in which the conveyance object X exists can be detected according to size data of the conveyance object X and the movement amount of the rotator 65.

Further, in the conveyor 1 and the conveying device 100 according to the present invention, another rotator can be disposed to put the conveyance object X between the rotator 65 in the guide portion 61 and the another rotator so that the conveyance object X is conveyed while being put between the pair of rotators under pressure. According to this configuration, even if the support portion 102 sucks the conveyance object X toward the planar portion, the conveyance object X can be surely prevented from moving with respect to the sucked side of the conveying member 4.

Further, in the conveyor 1 and the conveying device 100 according to the present invention, a pair of correction rollers that put the conveyance object X therebetween under pressure may be disposed on the conveyance inlet so that the axial direction is toward the direction orthogonal to the conveying direction of the conveyance object X so as to ensure the flatness of the curved sheet-like conveyance object X. Further, the pair of correction rollers may be so formed as to increase the diameter thereof toward both ends from the central portion in the axial direction. According to such structure described above, because the sheet-like conveyance object X is carried in so as to be pulled from the central portion toward both ends thereof, the flatness of the conveyance object X can be more surely ensured.

Further, in the conveyor 1 and the conveying device 100 according to the present invention, the suction means 6 may be configured so that the force for sucking the conveyance object X to the conveying member 4 can be adjusted. For example, conditions such as a material or thickness of the conveyance object X may be so selected as to automatically adjust the force. In order to apply the above configuration, the valves 68 or the respective terminal valves 107 may be formed of flow (opening) control valves, or the air suck-out amount of the sucking-out means 67 can be adjusted by, for example, an inverter. In the conveying device 100, the force for sucking the conveyance object X by the support portions 102 can be adjustably configured.

In the conveying device 100 according to the present invention, an sucking force for sucking the conveyance object X to the conveying member 4 by the suction means 6 may be reduced (or vice versa) toward both ends thereof from the central portion in the width direction (a direction orthogonal to the conveying direction of the conveyance object X). Further, the respective conveying members 4 do not execute suction at the same time, but the respective conveying members 4 may sequentially execute suction from the central portion toward both ends thereof in the width direction. According to such structure described above, the sheet-like conveyance object X can be conveyed while the flatness is more ensured.

Further, in the conveyor 1 and the conveying device 100 according to the above-mentioned embodiment, a case in which the conveyance object X is put on, that is, the conveyance path is formed on the upper side of the conveying member 4 has been described. However, the present invention is not limited to the above case, but there may be applied a case in which the conveyance path is formed on the lateral side or the lower side of the conveying member 4 to suck the conveyance object X to the conveying member 4 for conveyance.

Further, in the conveyor 1 according to the above-mentioned embodiment, a case in which the conveying member 4 is elongated in the conveying direction of the conveyance object has been described. However, the present invention is not limited to this case, but the conveying member 4 may be elongated in a direction orthogonal to the conveyance object, that is, may be widened.

Further, in the conveyor 1 according to the above-mentioned embodiment, a case in which the conveying member 4 is a flat belt has been described. However, the present invention is not limited to this case, but there may be applied a timing belt system as with the transmitting member 51, the drive shaft second direction change member 22, and the driven shaft second pulley 32. Specifically, the conveying member 4 includes, on the inner peripheral portion, a concavo-convex engaging portion disposed on the outer peripheral portion of the drive shaft first pulley, and a concavo-convex engaged portion corresponding to the concavo-convex engaging portion disposed on the outer peripheral portion of the driven shaft first pulley. The engaged portions may be constructed to be engageable with the respective engaging portions so as to prevent slippage from occurring between the conveying member 4 and the drive shaft first pulley, and between the conveying member 4 and the driven shaft first pulley.

Further, in the conveyor 1 according to the above-mentioned embodiment, a case in which the conveying member 4 is arranged such that the through-holes 41 are disposed in a line in the width direction has been described. However, the present invention is not limited to this case. For example, the conveying member may include the through-holes arranged in parallel in the width direction. Further, the conveying member may be shaped in bubble (sponge) to provide infinite through-holes.

Further, in the conveyor 1 according to the above-mentioned embodiment, a case in which the transmitting means 5 is the transmitting means 5 of the timing belt has been described. However, the present invention is not limited to this case. For example, the transmitting means may be formed of a gear mechanism or a link mechanism other than the wrapping drive. Further, there may be applied the wrapping drive as well as a wire rope drive, a flat belt drive, a V-belt drive, or a chain drive.

Further, in the conveyor 1 according to the above-mentioned embodiment, a case in which the transmitting member 51 is looped around the drive shaft (the first rotation shaft) 2 and the driven shaft (the second rotation shaft) 3 to rotate endlessly has been described. However, the present invention is not limited to this case. For example, the transmitting means 5 may be looped around a rotation shaft operationally coupled with the drive shaft 2 and a rotation shaft operationally coupled with the driven shaft 3 to rotate endlessly. In short, the transmitting member 51 may be constructed to be operationally coupled with the drive shaft 2 and the driven shaft 3 to rotate endlessly.

Further, in the conveyor 1 according to the above-mentioned embodiment, a case in which the plurality of openings 62 are formed in the guide portion 61 has been described. However, the present invention is not limited to this case. For example, one opening may be formed along the conveying direction of the guide portion. However, according to the conveyor 1 of the above embodiment, because air can be sucked in each of the regions in which the openings 62 are communicated with the communication portions 63, the region in which the conveyance object is sucked to the conveying member 4 can be adjusted (changed) with the results that, for example, a power capacity of the sucking-out means 67 for sucking the conveyance object can be reduced.

Further, in the conveyor 1 according to the above-mentioned embodiment, a case in which the suction means 6 sucks air from the plurality of openings 62 to suck the conveyance object which is put on the conveying member 4 to the conveying member 4 has been described. However, the present invention is not limited to this case. For example, the suction means may suck the conveyance object to the conveying member 4 by electrostatic suction.

Further, in the conveyor 1 according to the above-mentioned embodiment, a case in which the drive is transmitted to the drive shaft 2 from the drive source through the drive transmitting means 7 has been described. However, the present invention is not limited to this case. No drive transmitting means 7 may be provided. For example, the drive source may be connected directly to the drive shaft 2 so that the drive is transmitted to the drive shaft 2.

Further, in the conveyor 100 according to the above-mentioned embodiment, a case in which the plurality of conveying members 4 (conveyors 1) are arranged apart from each other has been described. However, the present invention is not limited to this case. The plurality of conveying members 4 (conveyors 1) may be arranged in contact (close contact) with each other. Further, for example, the conveying device may be configured so that the plurality of conveying members 4 (conveyor 1) are brought into or out of contact with each other.

Further, in the conveying device 100 according to the above-mentioned embodiment, a case in which the plurality of conveying members 4 (conveyors 1) having the same configuration (the same dimension in the conveying direction) are arranged so that the respective drive shafts 2 and the respective driven shafts 3 coincide in the axial line with each other has been described. However, the present invention is not limited to this case. The plurality of conveying members (conveyors) different in the dimension in the conveying direction may be arranged in parallel. Further, the plurality of conveying members (conveyors) may be arranged so that the respective drive shafts 2 do not coincide in the axial line with each other. Further, the plurality of conveying members (conveyors) may be arranged so that the respective driven shafts 3 do not coincide in the axial line with each other.

Further, in the conveying device 100 according to the above-mentioned embodiment, a case in which the drive transmission shaft 104 has the drive receiving second pulley 71, that is, the drive is transmitted through the drive transmitting means 7 has been described. However, the present invention is not limited to this case. The drive transmission shaft 104 may be the respective drive shafts 2, that is, the respective conveying members 4 may be looped around the drive transmission shaft 104 as the drive shaft 2. Specifically, the drive transmission shaft 104 may include the drive shaft first pulleys 21 that are brought into contact with the respective conveying members 4. In brief, at least all of the first rotation shafts (drive shafts) 2 are synchronized with each other to transmit the drive.

Further, when the driven shafts 3 of the respective conveyors 1 are a common transmission shaft, that is, the respective conveying members 4 may be looped around the common transmission shaft as the driven shafts 3. Specifically, the common transmission shaft may include the driven shaft first pulley 31 that is brought into contact with the respective conveying members 4. In brief, not only the first rotation shafts (drive shafts) 2, but also all of the second rotation shafts (driven shafts) 3 may be synchronized with each other to transmit the drive. However, as compared with the above conveying device, in the conveying device 100 according to the above embodiment, when the conveying member 4 is exchanged, the work of allowing the drive transmission shaft 104 and the common transmission shaft of the driven shafts to pass through each conveying member 4 is not required. Therefore, the exchange work of the conveying member 4 is easy.

Figure 9:
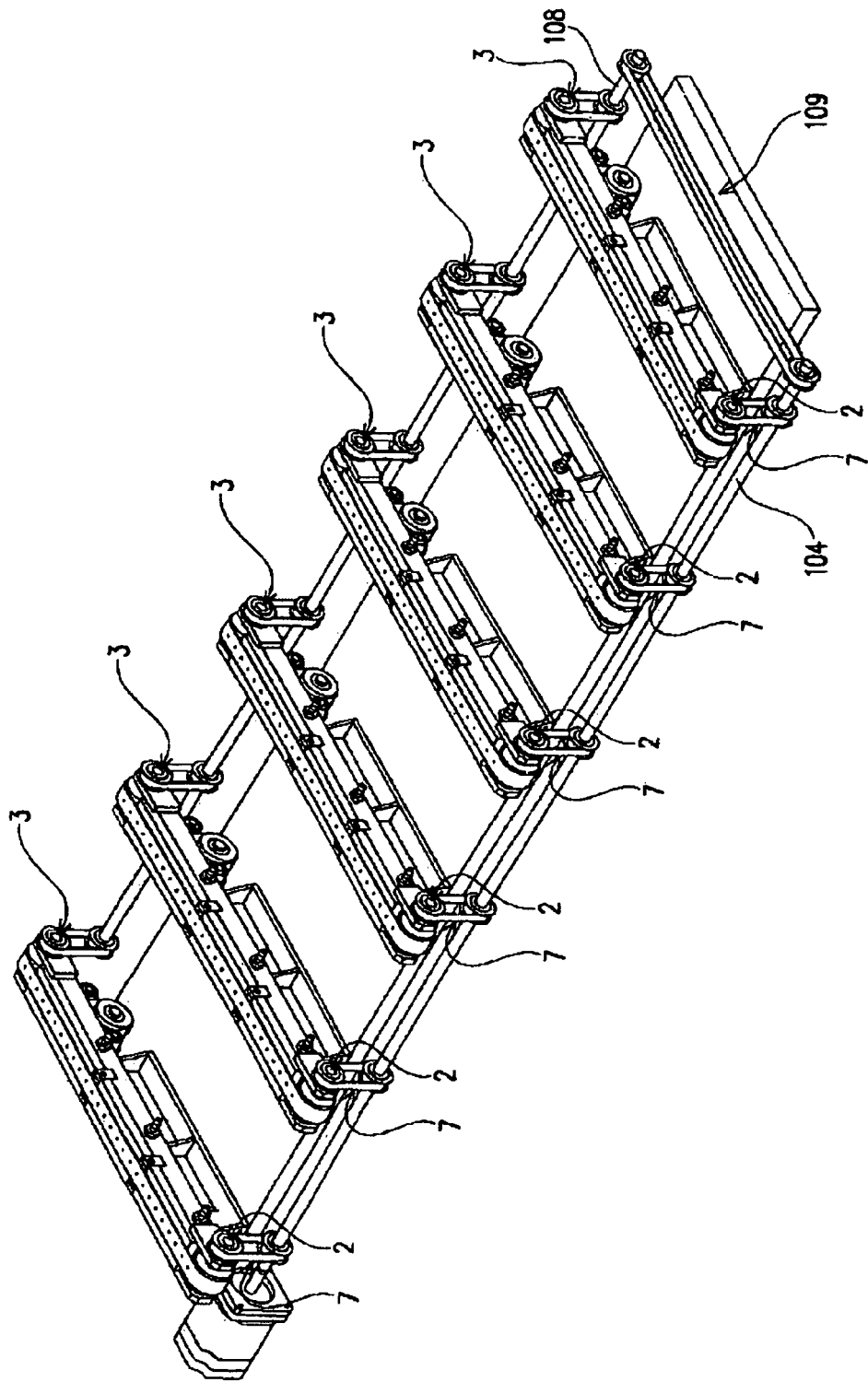
FIG. 9 is an overall view illustrating a conveying device according to another embodiment of the present invention, and is a perspective view.

Further, in the conveying device 100 according to the above-mentioned embodiment, a case in which the conveying members 4 (conveyors 1) are each equipped with the transmitting member 51 has been described. However, the present invention is not limited to this case. For example, as illustrated in FIG. 9, the drive can be transmitted to the respective driven shafts 3 from the common transmission shaft 108 as with the drive transmission shaft 104 and the drive receiving means 7. Further, one transmitting means (transmitting member) 109 can be disposed between the common transmission shaft 108 and the drive transmission shaft 104.

Further, in the conveying device 100 according to the above-mentioned embodiment, a case in which the support portions 102 each has the planar portion, and the conveyance object X is put across the planar portions and the conveying members 4 has been described. However, the present invention is not limited to this case. For example, support members in which each support is shaped in a bar can be arranged in parallel. According to this configuration, because an area where the conveyance object X is brought into contact with the support portions can be reduced, the frictional force occurring between the support and the conveyance object X can be reduced. In brief, the support portions are arranged so that the site of each support which is brought into contact with the conveyance object X during conveyance can be arranged to be flush or substantially flush with the outer peripheral portion of the conveying member 4. For example, the sheet-like conveyance object X can be conveyed while the flatness is ensured.

Further, in the conveying device 100 according to the above-mentioned embodiment, a case in which the plurality of support portions 102 are fixedly arranged has been described. However, the present invention is not limited to this case. The support portions 102 may be movably configured. For example, the support portions 102 may be constructed to be movable in a direction orthogonal to the planar portion (vertical direction). According to this configuration, when the conveyance object X which is rigid is conveyed, the support portions 102 are moved downward so that the conveyance object X is brought out of contact with the support portions 102. As a result, because no frictional force occurs between the conveyance object X and the support portions 102, the conveyance property of the conveyance object X can be improved.

Further, in the conveying device 100 according to the above-mentioned embodiment, a case in which each of the support portions 102 sucks air from the plurality of holes 105 in the planar portion to suck the conveyance object X has been described. However, the present invention is not limited to this case. Air may be belched from the plurality of holes 105. According to this configuration, when the conveyance object X is a sheet, the frictional force can be prevented from occurring between the support portion 102 and the conveyance object X while the flatness of the conveyance object X is ensured.

INDUSTRIAL APPLICABILITY

The present invention can be applied to, for example, a conveying device for a recording medium of a printer which can be used in an apparatus having the conveying device.

The invention claimed is:

1. A conveyor for conveying a conveyance object, the conveyor comprising:

an elastic flat conveying member looped around a first rotation shaft and a second rotation shaft for undergoing rotation endlessly along a conveying direction of the conveyance object through drive of the first rotation shaft, the conveying member having a plurality of through-holes;

transmitting means for transmitting the drive of the first rotation shaft to the second rotation shaft so that the first rotation shaft and the second rotation shaft are synchronized with each other, the transmitting means including a transmitting member looped around the first rotation shaft and the second rotation shaft and being configured to undergo rotation so as to transmit the drive of the first rotation shaft to the second rotation shaft; and suction means for sucking the conveyance object toward the conveying member, the suction means including a guide portion configured to guide the conveying member along the conveying direction, the guide portion including a plurality of openings communicating with the through-holes of the conveying member, a plurality of communication portions communicating with the plurality of openings and arranged along the conveying direction, and rotators arranged between respective adjacent pairs of the communication portions so as to contact the conveying member and so that upper portions of the rotators are flush with an upper surface of the guide portion to maintain the conveying member flat while the conveying member is guided along the conveying direction, the suction device being configured to suck in air from the plurality of openings through the respective communication portions to suck the conveyance object toward the conveying member, and the communication portions defining a plurality of regions via which suction of the conveyance object can be separately controlled to selectively suck preselected regions of the conveyance object.

2. A conveying device comprising:

a plurality of elastic flat conveying members spaced apart from each other and looped around first rotation shafts and second rotation shafts for undergoing rotation endlessly through drive of the first rotation shafts to convey a conveyance object along a conveying direction, the plurality of elastic conveying members having a plurality of through-holes and being arranged in parallel in a direction orthogonal to the conveying direction so that the conveyance object is conveyed while being crossed over the plurality of conveying members;

transmitting means for transmitting the drive of the first rotation shafts to the second rotation shafts so that the first rotation shafts and the second rotation shafts are synchronized with each other, the transmitting means including a plurality of transmitting members looped around the respective first and second rotation shafts of the respective plurality of conveying members, each of the transmitting members being configured to undergo rotation endlessly so as to transmit the drive of the first rotation shaft to the second rotation shaft;

a plurality of support portions arranged between the plurality of spaced-apart conveying members, each of the support portions having a planar surface provided with a plurality of holes and arranged so as to be substantially flush with the conveying members;

a plurality of suction devices associated with the respective support portions and being configured to suck air from the plurality of openings to suck the conveyance object toward the planar surfaces of the support portions, each of the suction devices including a guide portion configured to guide the conveying member along the conveying direction; and a plurality of rotators arranged relative to the conveying members so that the rotators are brought into contact with the conveying members during conveyance of the conveyance object and so that upper portions of the rotators are flush with upper surfaces of the respective guide portions to maintain the conveying members flat during conveyance of the conveyance object.

3. The conveying device according to claim 2, wherein the suction devices are configured to suck the conveyance object by an amount of force sufficient to prevent the conveyance object from moving relative to the plurality of conveying members during conveyance of the conveyance object.

4. The conveyor according to claim 1, wherein the guide portion has receiving portions for receiving the respective rotators.

5. The conveyor according to claim 4, further comprising:
first tension adjusting means for adjusting a pressure under which the conveying member is brought into contact with the first rotation shaft and the second rotation shaft in order to prevent slippage from occurring between the conveying member and the first rotation shaft or the second rotation shaft; and
second tension adjusting means for adjusting a pressure under which the transmitting member is brought into contact with the first rotation shaft and the second rotation shaft in order to prevent slippage from occurring between the transmitting member and the first rotation shaft or the second rotation shaft.

6. The conveyor according to claim 5, wherein:
the first rotation shaft and the second rotation shaft include concavo-convex engaging portions; and
the transmitting member includes concavo-convex engaging portions configured to mate with the concavo-convex engaging portions of the first rotation shaft and the second rotation shaft so that the transmitting member transmits the rotation so as to prevent slippage with the first rotation shaft or the second rotation shaft.

7. A conveying device comprising:
a plurality of the conveyors according to claim 1, the plurality of conveyors being arranged in parallel and spaced-apart relation to one another and being configured to be driven in synchronism with each other;
a plurality of support portions each including a planar surface and being arranged between the respective conveying members of the conveyors, the planar surfaces of the support portions being arranged to be flush with or substantially flush with the conveying members; and
synchronizing means for synchronizing the drive of the first rotation shafts of the conveying members of the plurality of conveyors to one another.

8. The conveyor according to claim 1, wherein the plurality of communication portions comprises three communication portions; and wherein the rotators comprises two rotators each disposed between two of the three communication portions.

9. The conveyor according to claim 8, wherein the guide portion has two receiving portions respectively receiving the two rotators.

10. The conveyor according to claim 1, wherein each of the rotators is fitted with a displacement detection sensor that detects a position of the conveyance object conveyed by the conveying member in accordance with a movement amount of the rotator.

11. A conveyor comprising:
a first rotational shaft mounted to undergo rotation;
a second rotational shaft mounted to undergo rotation and configured to be rotationally driven by the first rotational shaft;
an elastic flat conveying member looped around the first and second rotational shafts for undergoing rotation along a conveying direction of a conveyance object to be conveyed by the conveying member, the conveying member having a plurality of through-holes;
a transmitting member looped around the first and second rotational shafts for transmitting a rotational drive of the first rotational shaft to the second rotational shaft so that the first and second rotational shafts rotate in synchronization relative one another; and
a guide portion arranged between the first rotational shaft and the second rotational shaft and along the conveyance path of the of the conveyance object, the guide portion having a plurality of rotators, a plurality of receiving portions formed on an upper surface of the guide portion and receiving respective ones of the plurality of rotators, a plurality of openings arranged along the conveying direction and communicating with the plurality of through-holes of the conveying member, a plurality of communication portions communicating with the plurality of openings and positioned so that each of the rotators is arranged between respective adjacent pairs of the communication portions, and a plurality of connection members communicating with the plurality of openings via the communication portions, the plurality of connection members being configured for connection to a suction device for drawing air from the plurality of openings through the respective communication portions to draw by suction the conveyance object toward the conveying member, and the plurality of rotators being arranged between respective adjacent pairs of the communication portions so as to contact the conveying member and so that upper portions of the rotators are flush with an upper surface of the guide portion to maintain the conveying member flat during rotation of the conveying member along the conveying direction.

12. The conveyor according to claim 11, wherein the guide portion has a width larger than that of the conveying member and is configured to guide the conveying member by allowing a part of an upper surface portion of the guide portion arranged along the conveyance path to be brought into slide contact with the conveying member.

13. The conveyor according to claim 11, wherein the communication portions define a plurality of regions via which suction of the conveyance object can be separately controlled to selectively draw by suction preselected regions of the conveyance object.

14. The conveyor according to claim 13, wherein the connection members are configured for connection to respective ones of valves disposed between the connection members and the suction device for selectively controlling suction of the plurality of preselected regions of the conveyance object.

15. The conveyor according to claim 11, further comprising first tension adjusting means for adjusting a pressure under which the conveying member is brought into contact with the first and second rotational shafts to prevent slippage from occurring between the conveying member and the first rotational shaft or the second rotational shaft; and second tension adjusting means for adjusting a pressure under which the transmitting member is brought into contact with the first and second rotational shafts to prevent slippage from occurring between the transmitting member and the first rotational shaft or the second rotational shaft.

16. The conveyor according to claim 15, wherein each of the first and second rotational shafts include concavo-convex engaging portions, and the transmitting member includes concavo-convex engaging portions configured to mate with respective ones of the concavo-convex engaging portions of the first and second rotational shafts so that the transmitting member transmits the rotation so as to prevent slippage with the first rotational shaft or the second rotational shaft.

17. A conveying device comprising: a plurality of conveyors according to claim 11, the conveying members of the plurality of conveyors being spaced apart from each other so that the conveyance object is conveyed while being crossed over the conveying members, and the transmitting members of the plurality of conveyors being configured to transmit the rotational drives of the respective first rotational shafts to the respective second rotational shafts in synchronization with one another.

18. The conveying device according to claim 17, wherein the communication portions of each conveyor define a plurality of regions via which suction of the conveyance object can be separately controlled to selectively draw by suction preselected regions of the conveyance object.

19. The conveying device according to claim 17, wherein the connection members of each conveyor are configured for connection to respective ones of valves disposed between the connection members and the suction device for selectively controlling suction of the plurality of preselected regions of the conveyance object.

20. The conveying device according to claim 17, wherein each of the first and second rotational shafts of each conveyor include concavo-convex engaging portions, and the transmitting member of each conveyor includes concavo-convex engaging portions configured to mate with respective ones of the concavo-convex engaging portions of the first and second rotational shafts so that the transmitting member transmits the rotation so as to prevent slippage with the first rotational shaft or the second rotational shaft.

* * * * *